US012565220B2

(12) United States Patent
Kastens et al.

(10) Patent No.: US 12,565,220 B2
(45) Date of Patent: Mar. 3, 2026

(54) DETERMINING A VEHICLE CONFIGURATION WHICH IS ADAPTED TO THE DRIVING BEHAVIOR OF A PERSON

(71) Applicant: ZF Friedrichshafen AG, Friedrichshafen (DE)

(72) Inventors: Jens Kastens, Tettnang (DE); Heidi Rathgeb, Lindenberg (DE); Alexander Graf, Immenstaad (DE); Nicolas Blum, Julbach (DE); Andrea Agostinelli, Munich (DE); Dominic Schmidt, Karlsruhe (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 132 days.

(21) Appl. No.: 18/562,495

(22) PCT Filed: May 13, 2022

(86) PCT No.: PCT/EP2022/063028
§ 371 (c)(1),
(2) Date: Nov. 20, 2023

(87) PCT Pub. No.: WO2022/243190
PCT Pub. Date: Nov. 24, 2022

(65) Prior Publication Data
US 2024/0239355 A1     Jul. 18, 2024

(30) Foreign Application Priority Data
May 21, 2021     (DE) ..................... 10 2021 205 236.3

(51) Int. Cl.
B60W 50/00     (2006.01)
B60W 40/09     (2012.01)
H04W 4/02     (2018.01)

(52) U.S. Cl.
CPC ........ *B60W 50/0098* (2013.01); *B60W 40/09* (2013.01); *H04W 4/025* (2013.01);
(Continued)

(58) Field of Classification Search
CPC ........... B60W 40/09; B60W 2540/215; B60W 250/0083; H04W 4/025; G06Q 30/0631
See application file for complete search history.

(56) References Cited

U.S. PATENT DOCUMENTS 10,832,261 B1     11/2020   Chan et al.
2013/0253782 A1     9/2013   Saltsman et al.
(Continued)

FOREIGN PATENT DOCUMENTS

DE       102009019398 A1    11/2010
DE       102016006541 A1    11/2017
WO     WO 2013/142508 A2     9/2013

OTHER PUBLICATIONS

International Search Report (English Translation) PCT/EP2022/063028, dated Aug. 24, 2022. (2 pages).
(Continued)

*Primary Examiner* — Wade Miles
*Assistant Examiner* — Zachary Joseph Wallace
(74) *Attorney, Agent, or Firm* — Dority & Manning, P.A.

(57)     ABSTRACT

A method for determining a vehicle configuration (24) adapted to driving behavior of a person includes: determining a driving profile (20) of the person, wherein the driving profile (20) includes a speed profile and/or an acceleration profile of a vehicle (10) controlled by the person; determining category values (28) for the driving profile (20) for a plurality of vehicle configurations (24), wherein the category values (28) include one or both of an energy consumption and $CO_2$ emissions of the particular vehicle configuration (24), wherein the energy consumption and/or the $CO_2$ emissions are/is calculated from the speed profile and/or the acceleration profile; and determining an optimal vehicle configuration (24) by ascertaining vehicle configuration values (30) for each vehicle configuration (24) by weighting the category values (28) for each vehicle configuration (24) and selecting an optimal vehicle configuration value (30).

17 Claims, 1 Drawing Sheet

(52) U.S. Cl.
CPC ............... *B60W 2050/0083* (2013.01); *B60W 2540/215* (2020.02)

(56) References Cited

U.S. PATENT DOCUMENTS

| | | | |
|---|---|---|---|
| 2014/0214311 A1 | 7/2014 | Stevens et al. | |
| 2015/0073933 A1 | 3/2015 | Stieg et al. | |
| 2015/0254395 A1 | 9/2015 | Alenius et al. | |
| 2018/0349975 A1 | 12/2018 | Lee | |
| 2020/0202410 A1 | 6/2020 | Edwards et al. | |
| 2022/0187089 A1* | 6/2022 | Leung ................ | G01C 21/3469 |

OTHER PUBLICATIONS

German Search Report DE 10 2021 205 236.3, dated Mar. 10, 2022. (16 pages).

Von Zitzewitz, Moritz: Android Smartphone als Fahrzeug Datenlogger, 2012, 73 pages. www.eislab.fim.uni-passau.de/files/publications/students/vonZitzewitz-Studienarbeit-small.pdf [abgerufen am Mar. 10, 2022] English Translation (English abstract, p. 4): Von Zitzewitz, Moritz: Android Smartphone as Vehicle Data Recorder, 2012, 73 pages. www.eislab.fim.uni-passau.de/files/publications/students/vonZitzewitz-Studienarbeit-small.pdf [accessed on Mar. 10, 2022].

\* cited by examiner

DETERMINING A VEHICLE CONFIGURATION WHICH IS ADAPTED TO THE DRIVING BEHAVIOR OF A PERSON

CROSS-REFERENCE TO RELATED APPLICATIONS

The present application is related and has right of priority to German Patent Application No. DE102021205236.3 filed on May 21, 2021 and is a U.S. national phase of PCT/EP2022/063028 filed May 13, 2022, both of which are incorporated by reference in their entireties for all purposes.

TECHNICAL FIELD

The invention relates generally to a method, a computer program, a computer-readable medium and a system for determining a vehicle configuration which is adapted to the driving behavior of a person.

BACKGROUND

Persons who want to purchase a new vehicle are often overwhelmed by attempting to decide which is the correct drive train configuration to select. Sellers often cannot provide individual advice and may also not be objective or independent. In addition, the energy consumption, the fuel consumption and the carbon dioxide ($CO_2$) emissions of a vehicle depend on the driving behavior of the driver. Vehicles which are more economical and more environmentally-compatible can be provided by optimizing the vehicle configuration and, in particular, the drive train of the vehicle with respect to the driving behavior of the driver.

BRIEF SUMMARY

Example aspects of the invention provide a vehicle having low energy consumption, low fuel consumption, and/or low $CO_2$ emissions for a driver.

One example aspect of the invention relates to a method for determining a vehicle configuration, which is adapted to the driving behavior of a person or or of a driver. The computer-implemented method can be automatically carried out by a computer system. By the method, in particular, a suitable drive train for the vehicle can be recommended on the basis of the driving profile. The vehicle can be a road vehicle, such as, for example, a passenger car, a truck, or a motorcycle.

According to one example embodiment of the invention, the method includes: determining a driving profile of the person, wherein the driving profile includes a speed profile and/or an acceleration profile of a vehicle, which is controlled by the person. The driving profile is determined, in particular, using a vehicle other than the vehicle, the configuration of which is to be adapted or optimized. The driving profile includes data of a vehicle controlled by the person or the driver, which data can be recorded and/or collected during the journey. The data can include speed values and/or acceleration values. It is also possible that further information, such as, for example, a rotational speed of the prime mover of the vehicle, a shift position, an accelerator pedal position, etc., can be incorporated into the driving profile. The data can be collected using sensors in the vehicle and/or calculated from measured values from these sensors. All data are recorded over time for the driving profile.

According to one example embodiment of the invention, the method also includes: determining category values for the driving profile for a plurality of vehicle configurations, wherein the category values include, at the least, at least one of an energy consumption and $CO_2$ emissions of the particular vehicle configuration, and wherein the energy consumption and/or the $CO_2$ emissions are/is calculated from the speed profile and/or the acceleration profile. For example, a simulation, a machine learning algorithm, or a combination thereof can be used to calculate the category values. A category value evaluates a vehicle configuration with respect to the driving profile in terms of a certain category, such as, for example, fuel consumption, energy consumption, $CO_2$ emissions, etc.

The driving profile is used to determine one or multiple category value(s) for each of a plurality of vehicle configurations. An appropriate algorithm is used for this purpose, in which a vehicle configuration and the driving profile are entered and which outputs one or multiple category value(s).

A vehicle configuration determines the layout of the vehicle to be configured, i.e., which drive is to be used, how is the transmission designed, etc. Wind resistance and/or a body style can also be included in the vehicle configurations. It is possible that the person selects the plurality of vehicle configurations, for example, via a configurator application which is operated by the person.

According to one example embodiment of the invention, the method also includes: determining an optimal vehicle configuration by ascertaining vehicle configuration values for each vehicle configuration by weighting the category values for each vehicle configuration and selecting an optimal vehicle configuration value.

An optimal vehicle configuration is determined from the one or multiple category value(s). For this purpose, the category values are weighted in order to determine a vehicle configuration value. By the vehicle configuration value, a vehicle configuration can be evaluated with respect to the driving profile. It is possible that the person has established the weighting using the aforementioned configurator application.

The optimal vehicle configuration is determined from the vehicle configuration values. This can be the vehicle configuration having the highest or lowest vehicle configuration value.

According to one example embodiment of the invention, the driving profile is determined using a mobile device belonging to the person, which mobile device records movement data using internal sensors, and wherein the driving profile is generated from the movement data. The mobile device can be a smartphone or a tablet. An internal sensor can be a GPS sensor and/or an acceleration sensor. The data collected by the internal sensors of the mobile device can be stored in the mobile device and/or can be transmitted to a server via a data communication network for mobile devices, the server evaluating the data and carrying out further steps of the method.

According to one example embodiment of the invention, the mobile device is carried along in a vehicle, which is controlled by the person. By this vehicle, the movement profile or at least some routes of the driving profile is/are determined. In particular, the speed values and/or acceleration values of the driving profile can be recorded using a mobile device in this vehicle.

According to one example embodiment of the invention, the mobile device detects whether it is located in a controlled vehicle on the basis of the movement data and the driving profile is generated merely from movement data recorded in the vehicle. On the basis of acceleration values and/or speed values, it can be determined whether the person is walking or is located in a vehicle. It can therefore be automatically established whether values for the driving profile are to be recorded at the moment.

According to one example embodiment of the invention, the driving profile includes a plurality of routes. A route can be a certain route that the person has driven from a starting point to a destination point. A route can be traveled multiple times and/or regularly. The person can select, for example, using the mobile device, which of the routes are used to determine the category values. It is possible to incorporate only certain routes into the driving profile, such as, for example, the route to the workplace of the person.

A new route can be started every time the vehicle is stopped for a longer time and/or the mobile device detects that the mobile device has exited the vehicle or has been brought into the vehicle. The mobile device can be designed to establish data communication with the vehicle and, in this way, detect that the mobile device is to begin recording data for the driving profile and/or a route.

According to one example embodiment of the invention, the vehicle configuration includes at least one of the following pieces of information: a vehicle train; an average fuel consumption; a mass of a selected vehicle; and/or a drag coefficient of a selected vehicle. A vehicle configuration can include a drive type (such as, for example, electric, gasoline, diesel, gas, etc.), a prime motor type (for example, having different maximum powers), a transmission type (automatic/manual), etc. In addition, the vehicle configuration can include a body type, from which the drag coefficient can be derived. Generally, the vehicle configuration can include information which makes it possible to infer a fuel consumption or energy consumption of the vehicle to be configured depending on the driving profile.

According to one example embodiment of the invention, some of the weightings for the category values can be selected by the person. The person can select, for example, using the mobile device, which category is more important to him/her than another category, such as, for example, $CO_2$ emissions, energy consumption, wear, etc. By this selection the weighting for the important category can then be increased.

According to one example embodiment of the invention, the driving profile includes positions of a route, which is driven by the person. Not only the speed and/or the acceleration, but also the location of the vehicle can be stored in the driving profile. It can therefore be determined from map data whether certain regularly driven routes are advantageous for a vehicle configuration, or not. The driving profile can indicate, for example, that the person generally drives in town or in a mountainous area. In addition, filling stations and/or charging stations along routes can also be determined.

According to one example embodiment of the invention, a category value is determined, which takes charging stations for electrically operated vehicles and/or filling stations along the route into account. The category value for a vehicle configuration having an electric drive can depend, for example, on how many charging stations for the drive there are along the routes of the driving profile.

According to one example embodiment of the invention, the category values for the driving profile are determined by simulating following the driving profile with a vehicle having the vehicle configuration. On the basis of the speed profile and/or the acceleration profile and depending on the vehicle configuration, an energy consumption and/or $CO_2$ emissions of the particular vehicle configuration can be calculated. The driving profile can be divided into sections and/or distances. An energy consumption and/or $CO_2$ emissions can then be calculated for each section and/or distance of the driving profile. The energy consumption and/or $CO_2$ emissions can also be determined for individual routes.

The category values can therefore be determined via a simulation, by which the route that the person has followed with the vehicle is followed virtually with a vehicle having the desired vehicle configuration. The driving behavior of the person who is stored in the driving profile can be incorporated.

According to one example embodiment of the invention, every category value is determined by a machine learning algorithm into which the driving profile is entered. It is possible that a category value is calculated on the basis of the driving profile entirely by a machine learning algorithm. The output of the machine learning algorithm, such as, for example, an artificial neural network, is one or multiple category value(s).

According to one example embodiment of the invention, the energy consumption and/or the $CO_2$ emissions are determined by a machine learning algorithm as a function of a speed and/or an acceleration. It is possible that the machine learning algorithm determines an energy consumption and/or $CO_2$ emissions for the particular vehicle configuration only for a section and/or a distance of the simulated route which the vehicle having the vehicle configuration has covered in the simulation.

It is also possible that the machine learning algorithm also determines the vehicle configuration values, i.e., that the vehicle configuration values are output values of the machine learning algorithm and/or that a category value is already the vehicle configuration value of the vehicle configuration, which has been entered in the machine learning algorithm.

According to one example embodiment of the invention, the machine learning algorithm has been trained on multiple driving profiles, speeds and/or accelerations and a plurality of vehicle configurations for which the category values, the energy consumption and/or the $CO_2$ emissions are known. Driving profiles which have already been provided with category values can be stored in a database, for example, on the server. The machine learning algorithm, for example, an artificial neural network, is trained on data from this database in order to then calculate suitable category values, energy consumptions and/or $CO_2$ emissions from an unknown driving profile and a vehicle configuration.

According to one example embodiment of the invention, an associated machine learning algorithm is trained for each vehicle configuration. This means, there can be a separate machine learning algorithm for each vehicle configuration. Alternatively, the vehicle configuration can be additionally entered into the machine learning algorithm. In this way, category values, energy consumptions and/or $CO_2$ emissions can also be generated for vehicle configurations for which there were no training data. Overall, it is also possible that the machine learning algorithm also evaluates the vehicle configurations overall with respect to the driving profile, i.e., that a value is output for each vehicle configuration, which evaluates the vehicle configuration overall.

According to one example embodiment of the invention, the method also includes manufacturing a vehicle on the basis of the vehicle configuration. The determined vehicle configuration can be incorporated into an order for a vehicle, on the basis of which a vehicle is then manufactured, which has the vehicle configuration and, in particular, the appropriate drive train.

Further example aspects of the invention relate to a computer program which, when run on a computer system, instructs the computer system to carry out the method as described herein, and to a computer-readable medium in which such a computer program is stored.

A computer-readable medium can be a hard drive, a USB storage device, a RAM, a ROM, an EPROM or a FLASH drive. A computer-readable medium can also be a data communication network, such as, for example, the Internet, which makes it possible to download a program code.

The computer system can include, for example, the mobile device and, optionally, a server to which the mobile device is connected.

One further example aspect of the invention relates to a system for determining a vehicle configuration, which is adapted to the driving behavior of a person, the system being designed to carry out the method as described herein. It is understood that features of the system can also be features of the method and/or of the computer program and of the computer-readable medium, and vice versa. The system can be the above-described computer system. It is also possible that the vehicle with which the driving profile is recorded is part of the system.

BRIEF DESCRIPTION OF THE DRAWINGS

Exemplary embodiments of the invention are described in detail in the following with reference to the attached figures.

The reference characters used in the figures and their meaning are summarized in the list of the reference characters. Identical or similar parts are always labeled with the same reference characters.

DETAILED DESCRIPTION

Figure 1:
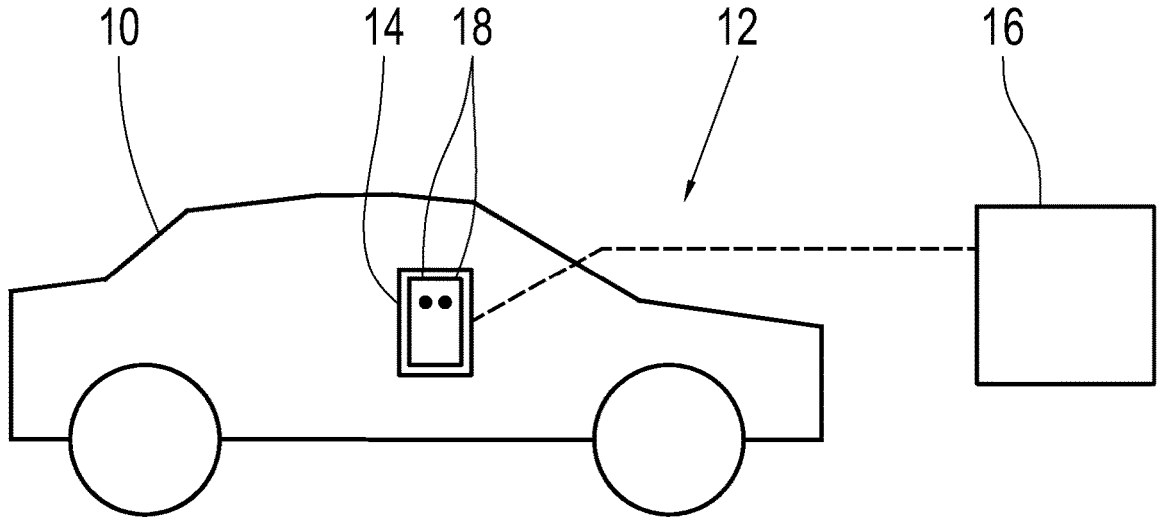
FIG. 1 schematically shows a system according to one exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a vehicle 10 together with a system 12 that includes a mobile device 14 and a server 16 for determining a vehicle configuration adapted to the driving behavior of a person. The mobile device 14, such as a mobile telephone or a tablet computer, is carried along in the vehicle 10 which is controlled by the person. During the journey, the mobile device 14 records movement data of the vehicle using internal sensors 18, such as, for example, a GPS sensor or an acceleration sensor, and transmits these data to a server 16 which compiles these data to form a driving profile of the person. The mobile device 14 and the server 16 are connected for data exchange by a mobile data communication network.

By an application, which is run by the mobile device 14, the person can also create multiple vehicle configurations which are transmitted to the server 16. On the basis of the driving profile, the server 16 then determines which of various vehicle configurations is optimal for the driving profile of the person and thus for their driving behavior with respect to one category or multiple categories, such as, for example, energy consumption or $CO_2$ emissions.

It is understood that the mobile device 14 can also carry out some of the method steps described above and in the following in connection with the server 16.

Figure 2:
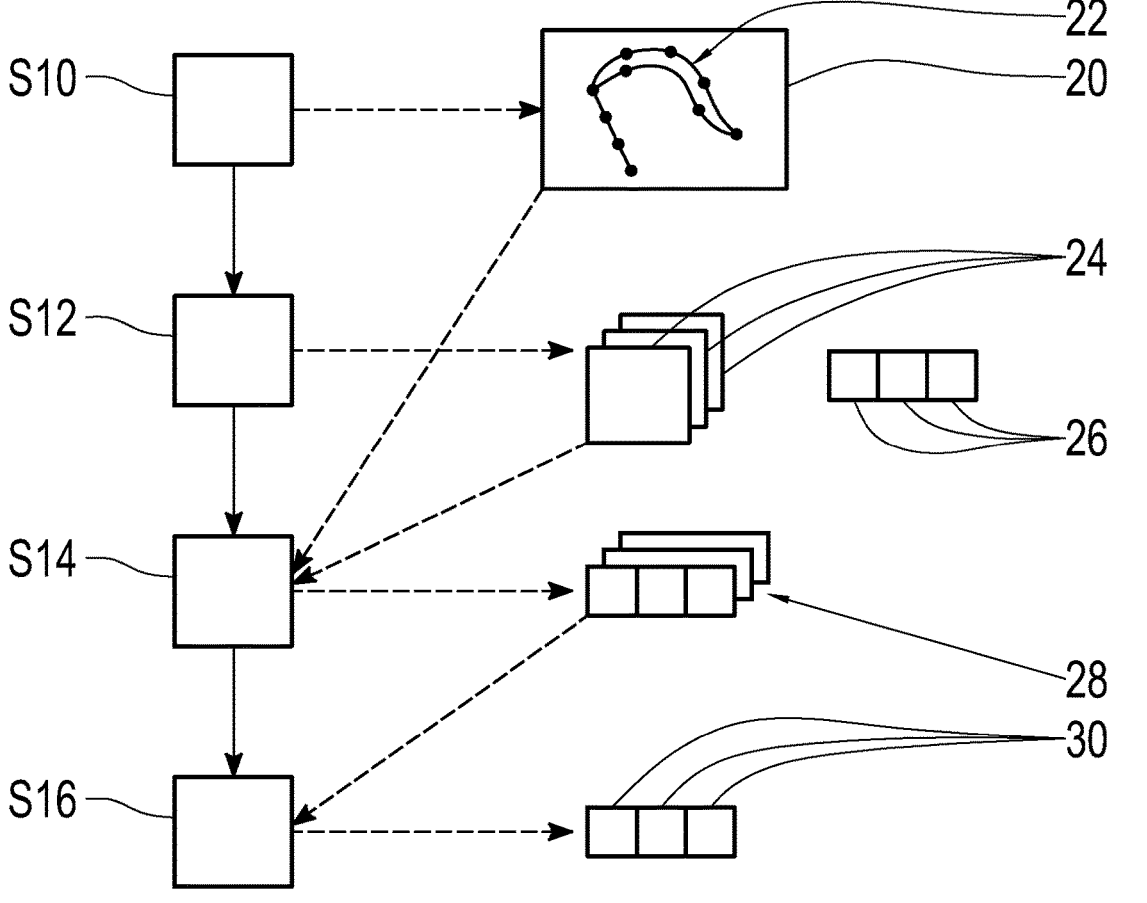
FIG. 2 shows a flow chart for a method according to one exemplary embodiment of the invention.

FIG. 2 shows a diagram illustrating a method for determining a vehicle configuration adapted to the driving behavior of the person. The method can be carried out by a software application on the mobile device 14 in interaction with further software components on the server 16. The software application on the mobile device can be obtained by the person via a digital distribution platform for application software from the operating system manufacturer of the mobile device 14. The person can also create a user account and use this to sign into the software application.

In the step S10, a driving profile 20 of the person is determined using the mobile device 14. The driving profile 20 includes a speed profile and/or an acceleration profile of the vehicle 10 which is controlled by the person, the speed profile and the acceleration profile having been recorded using the mobile device 14 which is carried along in the vehicle 10 which is controlled by the person. The driving profile 20 is determined using the mobile device 14 of the person, the mobile device 14 recording movement data using internal sensors 18, and wherein the driving profile 20 is created from the movement data. The movement data can include speeds, accelerations and/or positions.

For example, the software application on the mobile device can record position data during the journey and, thereafter, transmit these data to the server 16 for evaluation. In the server 16, a data history can be stored and preprocessed. The driving profile 20 can include a history of the movement data from journeys which the person has taken. The journeys can be recorded via the software application which is installed on the mobile device 14, via the integrated GNSS (Global Navigation Satellite System) receiver of the mobile device 14. A direct connection to the vehicle 10 is therefore not necessary. Vehicle data can also be integrated, however, for improving the estimates. For this purpose, the mobile device can receive these data via an interface with the vehicle 10.

It is possible that the mobile device 14 automatically detects whether the mobile device 14 is located in the controlled vehicle 10 on the basis of the movement data. The driving profile 20 can then be created merely from movement data recorded in the vehicle 10. In order to ensure that the person does not need to start recording the journey and stop the recording at the end of the journey himself/herself during each journey, the software application can automatically detect when a journey begins and ends and start and stop the recording process. For this purpose, it is detected whether the movement is possible or not especially without a vehicle in order to start the recording and, after a certain time without movement, the recording is stopped and the journey is concluded. Therefore, the software application can run in the background and requires hardly any attention from the person.

The individual journeys can also be stored as routes 22 in the driving profile 20. Using the mobile device 14, the person can select which of the routes 22 are used for the further procedure and/or are stored in a database in the server 16. The recorded position data, for example, of an individual journey which has been determined as described above, are subsequently compiled to form a route 22. These automatically recorded routes 22 can then be displayed to the person in an overview on the mobile device 14. It is possible that the person must release the routes 22 for further analysis. Routes 22 can also be deleted.

In the step S12, multiple possible vehicle configurations 24 are determined. This can take place, for example, by the person configuring one or more vehicle(s) using the software application and the server 16, in addition, determining possible vehicle configurations 24. It is also possible, however, that the following steps are carried out for all possible vehicle configurations 24, which are stored in the server 16.

The vehicle configuration 24 is a data structure which can include information on the following features of a configured vehicle: a drive type; a vehicle train; an average fuel consumption; a mass of the selected vehicle; a drag coefficient of the vehicle; etc. In particular, information regarding the speed and/or acceleration at which the vehicle consumes how much energy or fuel can be included in the vehicle configuration 24.

Overall, the method is to assist the person to find the drive train concept optimal for his/her driving profile 20. The properties of a (hybrid) drive train, for example, ICE (Internal Combustion Engine), HEV (Hybrid Electric Vehicle), PHEV (Plug-in Hybrid Electric Vehicle), BEV (Battery Electric Vehicle), hydrogen drive, natural gas drive, can be individually configured, wherein concepts which are presently not available can also be configured, such as, for example, a hypothetical hybrid drive with natural gas and hydrogen. In addition to the parameters for the drive, vehicle parameters can also be taken into account and/or stored in the vehicle configuration 24.

In the following steps of the method, vehicle configurations 24 are weighted with respect to certain categories. At least some of these weightings 26 can selected for the categories and/or the associated category values 28 by the person using the software application. For example, the person can select whether an electric drive is very important to him/her and/or whether he/she also wants to drive in regions which are hard-to-reach with electric vehicles. The weightings 26 can then be determined on the basis of this information.

It is understood that the steps S10 and S12 can also be carried out in reverse order.

In the step S14, category values 28 for the driving profile 20 are determined by the server 16 for a plurality of vehicle configurations 24. The category values 28 are determined at least for an energy consumption and/or CO2 emissions for the particular vehicle configuration 24, the vehicle configurations having been determined in the step S12. The energy consumption and the CO2 emissions are calculated from the speed profile and/or the acceleration profile, which were determined in the step S10.

The parameters from the particular vehicle configuration 24 are used in the calculation. Category values 28 can also be determined for further categories, such as, for example, saving costs, CO2 reduction, ease of charging/refueling, range, etc. A category value 28 evaluates the particular category, for example from 0 to 1, wherein 0 can mean "low" or "minimum" and 1 can mean "high" or "maximum."

In particular, the category value 28 is determined for a category for the driving profile 20 by simulating following the driving profile 20 using a vehicle having the vehicle configuration 24. The particular energy consumption and/or fuel consumption of the vehicle can be calculated from the parameters for the vehicle configuration 24 and the speed and/or acceleration along the journeys and/or the routes 22 stored in the driving profile 20. The parameters can be entered in a model of the vehicle, the model calculating the particular energy consumption and/or fuel consumption. The energy consumption and/or fuel consumption for a journey and/or a route 22 or for the overall driving profile 20 is calculated by adding up these values.

By the simulation, the fuel consumption/energy consumption and/or the CO2 emissions can be estimated during the journey on the basis of the speed profile and/or the acceleration profile. Data-driven models (such as, for example, machine learning) on the basis of historical vehicle data can be used for estimating. The model can also take vehicle parameters such as the indicated WLTP (Worldwide harmonized Light vehicles Test Procedure) consumption or the mass and the drag coefficient into account. Potential cost savings can also be calculated on the basis of the consumption values. Furthermore, additional costs/savings due to tax advantages, costs to maintain the vehicle (for example, electric vehicles do not require motor oil and have considerably lower brake wear due to the possible recuperation) and the devaluation can be taken into account. The environmental compatibility can be evaluated via the CO2 emissions.

The individual usage profile of the person, which results from the driving profile 20, is not compared with predefined usage profiles, but rather the driving behavior of the person is calculated, with the individual constraints and possible drive train configurations, by simulation.

A category value 28 can be determined by a machine learning algorithm into which the driving profile 20 is entered. It is also possible that the energy consumption and/or the CO2 emissions are determined by a machine learning algorithm as a function of a speed and/or an acceleration. The model with which the energy consumption and the CO2 emissions are determined during the simulation can be a machine learning algorithm. It is possible that an associated machine learning algorithm is trained for each vehicle configuration 24 or that the vehicle configuration 24 is additionally entered in the machine learning algorithm.

The position data and the cumulative consumption data can also be used to evaluate the comfort during recharging or refueling. These times differ considerably depending on the energy source. In general, it is possible to evaluate how frequently the person must recharge or refill the stored energy source (gasoline, diesel, battery, natural gas, hydrogen) in a given period of time. The corresponding category value 28 can be used as a second-priority evaluation criterion and/or weighted less. First priority or a higher weighting can be ascribed to an evaluation of how high the portion is of journeys or routes 22 which cannot be traveled with a single tank filling or charging and thus causes additional waiting time for the person for recharging or refilling. These evaluation criteria can also be weighted with respect to the existing charging infrastructure by comparing the position data from the driving profile 20 with existing map material.

When the driving profile 20 includes positions of a route 22 driven by the person, a category value 28 can be determined, which takes charging stations for electrically operated vehicles and filling stations along the route 22 into account. The availability of charging possibilities can be taken into account in the determination of the best possible drive train configuration. This means, when there are no charging stations in the vicinity of the routes 22, an electric vehicle is recommended less than when the charging infrastructure is better developed. In this way, regional differences can also be incorporated into the calculation.

In the step S16, an optimal vehicle configuration 24 is determined from the category values 28. For each vehicle configuration 24 which was determined in the step S12, a vehicle configuration value 30 is determined by weighting the category values 28 from the step S14. An optimal vehicle configuration value 30, for example, the highest vehicle configuration value 30, is selected from the vehicle configuration values 30 which the vehicle configuration 24 evaluates overall.

A vehicle configuration value 30 can be calculated by multiplying the category values 28 by the associated weightings 26 and subsequent summing.

The evaluation of the categories, i.e., the category values 28, can then be weighted in a user-defined manner and compiled to form a unitless total value, i.e., the vehicle configuration value 30, which can be used to reach a decision. The objective can be to recommend the drive train and/or the vehicle which maximizes the benefits to the person.

The software application can then retrieve the results, such as, for example, the category values 28 and/or the vehicle configuration value 30, from the server 16 and display these to the person on the mobile device 14.

In summary, the person can record his/her journeys manually or in an automated manner by his/her mobile device 14 via the GPS function of the mobile device 14. Once the person has confirmed that the recorded route is relevant for the analysis, the data are uploaded to a central database in the server 16 and analyzed there. When a representative database can be assumed, a drive train configuration is determined from the analyses that were carried out. Certain criteria (for example, economy, environmental impact) can be weighted differently in the determination. The recommendation is then transmitted to the mobile device 14 again and displayed to the person.

The software application on the mobile device 14 or the system 12 can also be used for other possibilities. For example, the driving profile 20 of the person can be compared with the average of driving profiles of other persons. The created driving profile 20 is compared with other driving profiles 20 in the database. The person can therefore be given specific feedback on his/her driving behavior. Abnormalities can be shown and suggestions for improvement of defined criteria can be displayed.

The system 12 can also still be used in a meaningful way after the vehicle has been sold. It can serve as proof of car insurance. This means, the person gets lower insurance premiums when he/she records, using the software application, a portion of his/her journeys, which is to be defined. The system 12 can then also provide feedback and recommendations regarding the driving behavior.

The software application can also determine the current odometer reading and/or the kilometers traveled (i.e., the kilometer reading) of the vehicle without being connected to the vehicle. For this purpose, it is only necessary to enter an initial odometer reading at the beginning or read out an initial odometer reading via an interface with the vehicle.

Regular service in a workshop can therefore also be coordinated. A current kilometer reading of the vehicle can be determined in order to plan for this loss of use as well as possible. Often there is no data connection to the vehicle, however, and the users also do not regularly share this information. The software application can determine the kilometer reading by continuously detecting the traveled routes.

In addition, it is pointed out that "including" does not rule out other elements or steps and "one" does not rule out a plurality. Moreover, it is pointed out that features or steps which have been described with reference to one of the aforementioned exemplary embodiments can also be utilized in combination with other features or steps of other above-described exemplary embodiments. Reference characters in the claims are not to be considered to be a limitation.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

10 vehicle
12 system
14 mobile device
16 server
18 motion sensor
20 driving profile
22 route
24 vehicle configuration
26 weighting
28 category value
30 vehicle configuration value

The invention claimed is:

1. A method for determining a vehicle configuration (24) adapted to driving behavior of a person, comprising:

determining a driving profile (20) of the person, the driving profile (20) comprising one or both of a speed profile and an acceleration profile of a vehicle (10) controlled by the person;

determining category values (28) of the driving profile (20) for each of a plurality of vehicle configurations (24), the category values (28) comprising one or both of an energy consumption and carbon dioxide emissions of each of the plurality of vehicle configurations (24), wherein the one or both of the energy consumption and the carbon dioxide emissions are calculated from one or both of the speed profile and the acceleration profile of the driving profile (20); and determining an optimal vehicle configuration (24) by ascertaining vehicle configuration values (30) for each of the plurality of vehicle configurations by weighting the category values (28) for each of the plurality of vehicle configurations (24) and selecting an optimal vehicle configuration value (30) from the vehicle configuration values (30), the optimal vehicle configuration value (30) being associated with the optimal vehicle configuration (24) of the plurality of vehicle configurations (24).

2. The method of claim 1, wherein:

determining the driving profile (20) comprises using a mobile device (14) of the person, the mobile device (14) recording movement data using internal sensors (18), and the driving profile (20) is determined based at least in part on the movement data; and the mobile device (14) is carried along in the vehicle (10) controlled by the person.

3. The method of claim 2, wherein the mobile device (14) detects whether the mobile device (14) is located in the vehicle (10) based on the movement data, and determining the driving profile (20) comprises generating the driving profile (20) from movement data recorded in the vehicle (10).

4. The method of claim 1, wherein:

the driving profile (20) comprises a plurality of routes (22);

the method further comprises receiving, via a mobile device (14), selection by the person of one or more of the plurality of routes (22); and the category values (28) of the driving profile (20) for each of the plurality of vehicle configurations (24) are determined based at least in part on the one or more of the plurality of routes (22) selected.

5. The method of claim 1, wherein each of the plurality of vehicle configurations comprises one or more of:

a vehicle drivetrain;

an average fuel or energy consumption;

a vehicle mass; or a vehicle drag coefficient.

6. The method of claim 1, wherein one or more of the weightings (26) for the category values (28) are selected by the person.

7. The method of claim 1, wherein:

the driving profile (20) comprises positions of a route (22) driven by the person; and determining the category values (28) comprises determining a category value (28) that considers charging stations for electrically operated vehicles and/or filling stations along the route (22).

8. The method of claim 1, wherein determining the category values (28) for the driving profile (20) comprises determining a respective category value by simulating following the driving profile (20) using a vehicle having each of the plurality of vehicle configurations (24).

9. The method of claim 1, wherein determining the category values (28) for the driving profile (20) comprises determining each category value (28) by a machine learning algorithm into which the driving profile (20) is entered.

10. The method of claim 1, wherein the one or both of the energy consumption and the carbon dioxide emissions are determined by a machine learning algorithm as a function of the one or both of the speed profile and the acceleration profile.

11. The method of claim 10, wherein:

a respective machine learning algorithm is trained for each vehicle configuration (24); or the vehicle configuration (24) is additionally entered into the machine learning algorithm.

12. A computer program which, when run on a computer system (12), instructs the computer system (12) to carry out the method of claim 1.

13. A non-transitory computer-readable medium, in which a computer program of claim 12 is stored.

14. A system (12) for determining a vehicle configuration (24) for driving behavior of a person, the system configured for implementing the method of claim 1.

15. The method of claim 4, wherein the one or more routes (22) includes a route to a workplace of the person.

16. The method of claim 1, further comprising:

receiving, via a mobile device (14), an input by the person indicating which one of the category values (28) is more important to the person than other ones of the category values (28); and changing one or more of the weightings (26) associated with the one of the category values (28) based on the input.

17. The method of claim 1, wherein the optimal vehicle configuration value (30) is the highest or lowest of the vehicle configuration values (30).

* * * * *